(12) United States Patent
Millett

(10) Patent No.: US 11,160,414 B2
(45) Date of Patent: *Nov. 2, 2021

(54) LIGHT GUIDE FOR GENERATING ILLUMINATED INDICIA FOR AN ELECTRIC BURNER OF A HEATING APPLIANCE

(71) Applicant: WHIRLPOOL CORPORATION, Benton Harbor, MI (US)

(72) Inventor: Frederick Millett, Grand Haven, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 260 days.

This patent is subject to a terminal disclaimer.

(21) Appl. No.: 16/392,123

(22) Filed: Apr. 23, 2019

(65) Prior Publication Data

US 2019/0246832 A1    Aug. 15, 2019

Related U.S. Application Data

(63) Continuation of application No. 14/809,883, filed on Jul. 27, 2015, now Pat. No. 10,314,427.

(51) Int. Cl.
*H05B 3/68* (2006.01)
*A47J 36/00* (2006.01)
(Continued)

(52) U.S. Cl.
CPC ............ *A47J 36/00* (2013.01); *A47J 27/004* (2013.01); *F24C 7/082* (2013.01); *F24C 7/083* (2013.01);
(Continued)

(58) Field of Classification Search
CPC ......... A47J 27/004; A47J 36/00; F24C 7/082; F24C 7/083; G02B 5/122; G02B 6/00;
(Continued)

(56) References Cited

U.S. PATENT DOCUMENTS 4,422,719 A    12/1983  Orcutt
4,990,750 A    2/1991   Martel et al.
(Continued)

FOREIGN PATENT DOCUMENTS

DE    4100767    7/1992
DE    4405610    8/1995
(Continued)

*Primary Examiner* — Sang Y Paik
(74) *Attorney, Agent, or Firm* — Price Heneveld LLP

(57) ABSTRACT

A heating appliance includes a translucent cooktop and a burner in communication with the cooktop. The burner is operable between deactive and active states. The upper surface of the cooktop defines a cooldown state after the burner is moved from the active to the deactive state. A light module includes a light source and is in an illuminated state when the burner is in the active state and when the cooktop is in the cooldown state. A light guide extends from the light module and around a portion of the burner. The light guide is positioned such that the light source directs light through the light guide. The outer surface of the light guide includes a formed surface that directs light upward and through the cooktop, wherein the light guide is visible through the cooktop when the light module is in the illuminated state.

9 Claims, 6 Drawing Sheets

(51) Int. Cl.
    *G02B 5/122*     (2006.01)
    *H05B 3/74*     (2006.01)
    *H05B 6/12*     (2006.01)
    *F24C 7/08*     (2006.01)
    *F24C 15/10*     (2006.01)
    *F21V 8/00*     (2006.01)
    *A47J 27/00*     (2006.01)
    *G02B 6/00*     (2006.01)

(52) U.S. Cl.
    CPC ............ *F24C 15/102* (2013.01); *G02B 5/122* (2013.01); *G02B 6/00* (2013.01); *G02B 6/001* (2013.01); *H05B 3/74* (2013.01); *H05B 3/746* (2013.01); *H05B 6/1218* (2013.01); *G02B 6/0006* (2013.01)

(58) Field of Classification Search
    CPC .... G02B 6/001; H05B 1/0202; H05B 1/0258; H05B 3/74; H05B 3/746; H05B 6/1218
    USPC .......................................... 219/443.1–468.2
    See application file for complete search history.

(56) References Cited

U.S. PATENT DOCUMENTS

| | | |
|---|---|---|
| 5,013,893 A | 5/1991 | Goessler et al. |
| 5,067,831 A | 11/1991 | Robbins et al. |
| 5,103,077 A | 4/1992 | Goessler et al. |
| 5,162,636 A | 11/1992 | Randolph, Jr. et al. |
| 5,448,036 A | 9/1995 | Husslein et al. |
| 5,664,862 A | 9/1997 | Redmond et al. |
| 5,750,959 A | 5/1998 | Plumptre |
| 5,977,522 A | 11/1999 | Henrich et al. |
| 6,300,602 B1 | 10/2001 | Platt et al. |
| 6,639,190 B2 | 10/2003 | Lerner |
| 6,760,157 B1 | 7/2004 | Allen et al. |
| 6,794,621 B1 | 9/2004 | Brown et al. |
| 6,806,444 B2 | 10/2004 | Lerner |
| 6,969,834 B2 | 11/2005 | Kaji et al. |
| 7,087,865 B2 | 8/2006 | Lerner |
| 7,109,450 B2 | 9/2006 | Kaji et al. |
| 7,173,221 B2 | 2/2007 | Lerner |
| 7,845,808 B2 | 12/2010 | Lai |
| 8,667,958 B2 | 3/2014 | Cadima |
| 9,167,641 B2 | 10/2015 | Shackle et al. |
| 10,314,427 B2* | 6/2019 | Millett .................. A47J 27/004 |
| 2003/0156431 A1* | 8/2003 | Gozum ................... G02B 6/001 362/582 |
| 2003/0192873 A1 | 10/2003 | Lerner |
| 2004/0238524 A1 | 12/2004 | Lerner |
| 2005/0242085 A1 | 11/2005 | Kaji et al. |
| 2006/0081602 A1 | 4/2006 | Lerner |
| 2007/0041573 A1 | 2/2007 | Jung et al. |
| 2009/0225430 A1 | 9/2009 | Barnes et al. |
| 2012/0138590 A1 | 6/2012 | Brosnan et al. |
| 2013/0249577 A1 | 9/2013 | Knapp et al. |
| 2013/0286630 A1 | 10/2013 | Guiset et al. |
| 2014/0001950 A1* | 1/2014 | Fujii ...................... G02B 1/04 313/504 |
| 2014/0322379 A1* | 10/2014 | Hsu ........................ B29C 48/12 425/174.4 |
| 2015/0021312 A1 | 1/2015 | Zenker et al. |

FOREIGN PATENT DOCUMENTS

| | | |
|---|---|---|
| DE | 19632271 | 2/1998 |
| EP | 2752623 | 7/2014 |
| WO | 2006043982 | 4/2006 |
| WO | 2012059664 | 5/2012 |
| WO | 2013083527 | 6/2013 |

\* cited by examiner

LIGHT GUIDE FOR GENERATING ILLUMINATED INDICIA FOR AN ELECTRIC BURNER OF A HEATING APPLIANCE

CROSS-REFERENCE TO RELATED APPLICATION

The present application is a continuation of U.S. patent application Ser. No. 14/809,883 filed Jul. 27, 2015, entitled LIGHT GUIDE FOR GENERATING ILLUMINATED INDICIA FOR AN ELECTRIC BURNER OF A HEATING APPLIANCE, the entire disclosure of which is hereby incorporated herein by reference.

BACKGROUND

The device is in the field of electric appliances such as ranges and cooktops. Specifically, the device is in the field of illuminated indicia for communicating the heating condition of a cooktop during use of the electric heating appliance.

SUMMARY

In at least one aspect, a heating appliance includes a cooktop that is at least partially translucent and an electric burner positioned in thermal communication with an upper surface of the cooktop. The electric burner is operable between a deactive state and at least one active state, wherein the upper surface of the cooktop proximate the electric burner defines a temporary cooldown state after the electric burner is moved from the at least one active state to the deactive state. A light module includes at least one light source, wherein the light module is in an illuminated state when the electric burner is in the at least one active state, and wherein the light module remains at least partially in the illuminated state during the temporary cooldown state. A light guide extends from the light module and extends around a portion of the electric burner. The light guide is positioned such that the light source directs light through the light guide. The outer surface of the light guide includes a formed surface for directing the light upward and through the cooktop such that the light guide is at least partially visible through the cooktop when the light module is in the illuminated state.

In at least another aspect, a light module is in communication with a translucent cooktop, wherein the light module includes a plurality of lighting elements that selectively direct light through a silicone light guide. An electric burner is positioned proximate a translucent cooktop, wherein the silicone light guide extends at least partially around the electric burner and directs light from the light module through the translucent cooktop to reveal an illuminated indicia of a plurality of illuminated indicia within the upper surface of the translucent cooktop. A temperature sensor is in communication with the light module, wherein the temperature sensor measures a surface temperature of the translucent cooktop proximate the electric burner. The plurality of light elements generates the plurality of illuminative indicia by directing light from the plurality of lighting elements and through the translucent cooktop in response to the surface temperature of the translucent cooktop via the silicone light guide.

In at least another aspect, a heating appliance includes an electric burner positioned below a translucent cooktop, wherein the electric burner selectively provides heat to the upper surface of the translucent cooktop to generate a plurality of heating conditions. A light module has a plurality of light fixtures and at least one solid silicone prism, wherein each of the plurality of light fixtures is positioned to direct light through one of first and second ends of the at least one solid silicone prism to produce a plurality of illuminated indicia visible through the translucent cooktop. The plurality of illuminated indicia includes a plurality of operational indicia, wherein each operational indicia of the plurality of operational indicia corresponds to a respective heating condition of the plurality of heating conditions, and wherein each of the plurality of illuminated indicia is positioned proximate the electric burner. A control operates the electric burner to generate the plurality of heating conditions and the corresponding plurality of operational indicia.

In at least another aspect, a heating appliance includes a translucent cooktop surface and an electric burner positioned below and in thermal communication with the cooktop surface. The electric burner is operable between a deactive state and at least one active state, wherein the cooktop surface proximate the electric burner defines a temporary cooldown state after the electric burner is moved from the at least one active state to the deactive state. A light module includes at least one light source, wherein the light module is in an illuminated state when the electric burner is in the at least one active state, and wherein the light module remains in the illuminated state during the temporary cooldown state. A fiber optic light guide extends from the light module and extends around a portion of the electric burner, wherein the fiber optic ring is positioned such that the light source directs light through the fiber optic ring, and wherein the outer surface of the fiber optic ring includes a conditioned surface for directing the light upward and through the translucent cooktop surface.

In at least another aspect, a heating appliance includes an electric burner positioned beneath a translucent cooktop and a light module in communication with the translucent cooktop proximate the electric burner. The light module includes a plurality of light elements that selectively direct light through a fiber optic light guide extending at least partially around the electric burner and a temperature sensor in communication with the light module. The temperature sensor measures a surface temperature of the translucent cooktop proximate the electric burner, and the plurality of light elements generates a plurality of illuminative indicia within the fiber optic light guide that corresponds to the surface temperature of the translucent cooktop.

In at least another aspect, a heating appliance includes an electric burner positioned below a translucent cooktop, wherein the electric burner selectively provides heat to the upper surface of the translucent cooktop to generate a plurality of heating conditions. A light module has a plurality of light fixtures and at least one fiber optic light guide, wherein each of the plurality of light fixtures is positioned to direct light through one of first and second ends of the at least one fiber optic light guide to produce a plurality of illuminated indicia visible through the translucent cooktop, wherein the plurality of illuminated indicia includes a plurality of operational indicial, wherein each operational indicia of the plurality of operational indicial corresponds to a respective heating condition of the plurality of heating conditions. Each of the plurality of illuminated indicia is positioned proximate the electric burner. A control operates the electric burner to generate the plurality of heating conditions and the corresponding plurality of operational indicia.

These and other features, advantages, and objects of the present device will be further understood and appreciated by those skilled in the art upon studying the following specification, claims, and appended drawings.

DETAILED DESCRIPTION OF EMBODIMENTS

Figure 1:
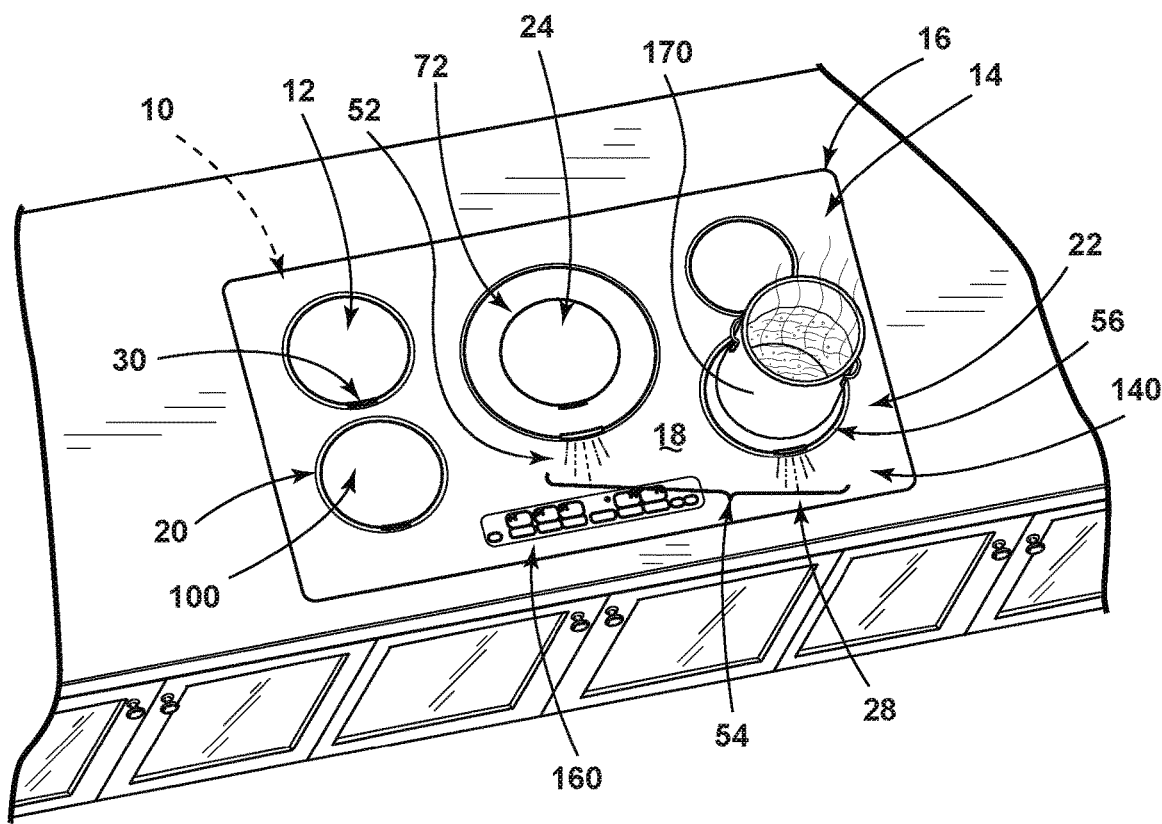
FIG. 1 is a top perspective view of a cooktop disposed within a counter and incorporating an aspect of the indicial light module of the present device.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As illustrated in FIGS. 1-6, reference numeral 10 generally refers to an indicial light module to be positioned proximate an electric burner 12 and under a cooktop 14 of a heating appliance 16. The heating appliance 16 can include a cooktop 14 that is at least partially translucent and an electric burner 12 that is positioned in thermal communication with an upper surface 18 of the cooktop 14. The electric burner 12 is configured to be operable between a deactive state 20 and at least one active state 22. The upper surface 18 of the cooktop 14 proximate the electric burner 12 can also define a temporary cooldown state 24, which can occur after the electric burner 12 is moved from the at least one active state 22 to the deactive state 20. It is contemplated that the cooldown state 24 can be further defined as the upper surface 18 of the cooktop 14 cooling down after being heated during the at least one of the active states 22, as will be more fully described below. The heating appliance 16 can also include the indicial light module 10 that includes at least one light source 26. The indicial light module 10 is configured to be in an illuminated state 28 at least when the electric burner 12 is in the at least one of the active states 22. It is contemplated that the indicial light module 10 can be at least partially in the illuminated state 28 during the temporary cooldown state 24 of the heating appliance 16. A light guide 30 is configured to extend from the indicial light module 10, where the light guide 30 extends around a portion of the electric burner 12. The light guide 30 is positioned such that the light source 26 of the indicial light module 10 directs light through the light guide 30. The outer surface 32 of the light guide 30 includes a formed or conditioned surface 34 for directing the light 50 from the light source 26 upward and through the partially translucent cooktop 14 such that the light guide 30 is at least partially visible through the partially translucent cooktop 14 when the indicial light module 10 is in the illuminated state 28 and/or a partial gradient of the illuminated state 28. According to the various embodiments, it is contemplated that the light guide 30 can be a silicone light guide 30 that is a substantially solid silicone prism 40 that extends at least partially around the electric burner 12 of the heating appliance 16. Other materials of the light guide 30 are also contemplated, as will be described more fully below.

Referring again to FIGS. 1-6, it is contemplated that the at least one active state 22 of the electric burner 12 can include a plurality of electric power levels 68, through which the flow of electrical current 70 from a power source (not shown) can be delivered to an electric burner 12 to define the plurality of electric power levels 68. The varied flow of electrical current 70 can, in turn, increase or decrease the amount of heat 72 emitted from the electric burner 12 and transferred to the partially translucent cooktop 14. It is also contemplated that the illuminated state 28 of the indicial light module 10 includes a plurality of lighting intensities 74 that can correspond to the plurality of electric power levels 68 of the electric burner 12. In this manner, according to various aspects of the device, it is contemplated that the indicial light module 10 can provide varying intensities of light 50 through the light guide 30 for indicating to the user the amount of heat 72 being provided by the electric burner 12 to the upper surface 18 of the partially translucent cooktop 14. It is also contemplated that the plurality of lighting intensities 74 provided by the indicial light module 10 can be generated by at least one lighting element 80 positioned within the light module 10. Accordingly, as the lighting intensity of the indicial light module 10 needs to be increased to correspond to an increase in heat 72, additional lighting elements 80 disposed within the indicial light module 10 can be activated to increase the amount of light 50 delivered through the light guide 30 to be directed through the partially translucent cooktop 14. Alternatively, it is contemplated that the plurality of light intensities of the indicial light module 10 can be provided by a single lighting element 80 that can provide various amounts of light 50 depending upon the flow of electrical current 70 delivered to the lighting element 80 disposed within the indicial light module 10.

According to the various embodiments, the indicial light module 10 can be used in conjunction with any one of various heating appliances 16. Such heating appliances 16 can include cooktops 14 having electric burners 12 that are resistive heating elements, inductive heating elements, combination resistive/inductive heating elements, and other similar electrical burners. Additionally, it is contemplated that the indicial light module 10 can be used in conjunction with gas-powered heating appliances 16. When disposed within a heating appliance 16, the indicial light module 10 is configured to provide a light guide 30 that extends at least partially around the electric burner 12 (or other type of heating element, as discussed herein) where the light guide 30 is configured to direct light 50 from the indicial light module 10 through the translucent cooktop 14 to reveal an illuminated indicia 52 of a plurality of illuminated indicia 54 within the upper surface 18 of the translucent cooktop 14. In this manner, the illuminated indicia 52 can communicate to the user of the appliance the temperature 56 of the upper surface 18 of the cooktop 14, or an approximation thereof based upon various configurations of the indicial light module 10.

Referring again to FIGS. 1-6, various embodiments of the heating appliance 16 can include a temperature sensor 90 that is in communication with the cooktop 14, where the temperature sensor 90 records a temperature 56 of the upper surface 18 of the cooktop 14 proximate the electric burner 12. According to the various embodiments, the temperature sensor 90 can be placed in communication with the indicial light module 10 to provide information as to the temperature 56 of the upper surface 18 of the cooktop 14. The information as to the temperature 56 can be used to control the operation of the indicial light module 10 to provide a corresponding illuminated indicia 52 that is adapted to communicate to the user the temperature 56 of the upper surface 18 of the cooktop 14. Such information can be useful during the cooldown state 24 of the electric burner 12, where the electric burner 12 can be in the deactive state 20, but the electric burner 12 and/or the upper surface 18 of the cooktop 14 may temporarily have an elevated temperature 56.

By way of example, but not limitation, in certain heating appliances 16 having resistive heating elements, the resistive heating elements are generally visible through the cooktop 14 when the heating elements are in an active state 22 and in producing heat 72 to transfer to the upper surface 18 of the cooktop 14. In such conditions, the illumination of the resistive heating elements through the flow of electrical current 70 through the resistive heating element can provide an indication to the user that the heating element is activated and the upper surface 18 of the cooktop 14 is at an elevated temperature 56. When the resistive heating element of the electric burner 12 is moved to the deactive state 20, it is typically the case that the resistive heating element is no longer illuminated, but the resistive heating element and/or the upper surface 18 of the cooktop 14 remain at an elevated temperature 56. In heating appliances 16 that incorporate the indicial light module 10, the indicial light module 10 provides illuminated indicia 52 to the user to communicate that the surface temperature 56 of the cooktop 14 is at an elevated level to be warm or hot, whether the electric burner 12 is in the deactive state 20, any of the active states 22 and/or the cooldown state 24. The various illuminated indicia 52 can include one or more types of indicia that communicate various information to the user. Such illuminated indicia 52 related to the status of the heating appliance 16 can include, but is not limited by, heat indicia, temperature indicia, function indicia, heating condition indicia, and others.

According to the various embodiments, the cooldown state 24 of the electric burner 12 can be defined by an elevated surface temperature 56 of the upper surface 18 of the cooktop 14 after the electric burner 12 has been moved from one of the active states 22 to the deactive state 20. The cooldown state 24 can persist until such time as the surface temperature 56 of the upper surface 18 of the cooktop 14 reaches or falls below a predetermined temperature 100. At this point, the illuminated state 28 of the indicial light module 10 can be deactivated and the lighting elements 80 turned off. The temperature sensor 90 can communicate to the indicial light module 10 the temperature 56 of the upper surface 18 of the cooktop 14 such that the indicial light module 10 can convey an illuminated indicia 52 to the user as to the existing temperature 56 when the surface temperature 56 of the upper surface 18 of the cooktop 14 exceeds the predetermined temperature 100. It is contemplated that such illuminated indicia 52 can include one or more of the plurality of light intensities provided by one or more lighting elements 80 disposed within the indicial light module 10.

It is also contemplated that the illuminated indicia 52 can be a plurality of colored lights 110 that are directed through the partially translucent cooktop 14. Such colored lights 110 can correspond to the temperature 56 of the upper surface 18 of the cooktop 14. In such an embodiment, the plurality of light elements within the indicial light module 10 can include a first light element 120 having a first color 122 and a second light element 124 having a second color 126. The plurality of illuminated indicia 54 produced by the plurality of lighting elements 80 can include a plurality of illuminated colors delivered by a single light guide 30, or multiple light guides 30, and directed through the partially translucent cooktop 14. In this manner, the first and second light elements 120, 124 can be simultaneously illuminated, and at varying intensities, to form a third color 128 of the illuminated indicia 52. It is contemplated that the light guide 30 for providing the plurality of illuminated colors can be made of various materials. Such materials can include, but are not limited to, silicone, fiber optic cable, plastic, glass, combinations thereof, and other similar light-transmitting materials.

It is contemplated that the number of colored lighting elements 80 within the indicial light module 10 can vary depending upon the configuration of the heating appliance 16 and the number of colored lights 110 intended to be included to produce the illuminated indicia 52 for the heating appliance 16. It is also contemplated that various colored lights 110 can be combined to produce a wide range of colored indicia such that the illuminated indicia 52 visible through the partially translucent cooktop 14 can appear to be a series of stepped color variations or a gradual change in color that can correspond to the gradual change in the temperature 56 of the upper surface 18 of the cooktop 14. It is also contemplated that the plurality of light intensities and the plurality of colored lights 110 that define the illuminated indicia 52 can correspond to a corresponding heating condition 140 or heating function of a plurality of heating conditions 140 or heating functions of the heating appliance 16, as will be described more fully below.

According to the various embodiments, where a temperature sensor 90 is not included in the heating appliance 16, the illuminated state 28 of the indicial light module 10 can be activated when the flow of electrical current 70 is delivered to the electric burner 12 to place the electric burner 12 in one of the active states 22. In such an embodiment, it is contemplated that an electrical sensor 150 for monitoring the presence or absence of electrical current 70 and/or the amount of electrical current 70 flowing through a particular electric burner 12.

According to the various aspects of the device, the heating appliance 16 incorporating the indicial light module 10 can be configured to provide the illuminated indicia 52 without the aid of a temperature sensor 90. In such an embodiment, it is contemplated that the flow of electrical current 70 provided to the electric burner 12, which generally corresponds to the temperature 56 of the upper surface 18 of the cooktop 14, can be used to communicate to the indicial light module 10 the intensity and/or color of the illuminated indicia 52 to provide for viewing through the translucent cooktop 14. In such an embodiment, the greater the flow of electrical current 70 through the electric burner 12, the higher the temperature 56 will be of the upper surface 18 of the cooktop 14. As the flow of electrical current 70 is increased or decreased, the increase or decrease in the flow of electrical current 70 will communicate to the indicial light module 10 how, based upon the change in heat 72, the illuminated indicia 52 should appear through the translucent cooktop 14.

By way of example, and not limitation, a greater flow of electrical current 70 can correspond to an illuminated indicia 52 that communicates a higher temperature 56. Conversely, a lesser flow of electrical current 70 can correspond to an illuminated indicia 52 that communicates a lower temperature 56. When the flow of electrical current 70 to the electric burner 12 is interrupted and the electric burner 12 and the cooktop 14 are placed in the cooldown state 24, it is contemplated that a control 160 for operating the indicial light module 10 can include a timing function that corresponds to the general time necessary for the electric burner 12 and the cooktop 14 to cool down after being at a particular heating level. Such a timer function would necessarily include an approximated time for cooling down the electric burner 12 and the cooktop 14 since various factors can dictate the amount of time actually necessary for cooling down the electric burner 12 and cooktop 14 for the heating appliance 16. While the timing function may not be a precise indicator of the actual temperature 56 of the upper surface 18 of the cooktop 14, the timing function may be used in various models of heating appliances 16 that are intended to include different applications and functions.

Referring again to FIGS. 1-6, where the heating appliance 16 includes a temperature sensor 90 for communicating to the indicial light module 10 the temperature 56 of the upper surface 18 of the cooktop 14, the indicial light module 10 can receive electrical current 70 that is delivered separately and independently from the electric current delivered to the electric burner 12. Accordingly, the flow of electrical current 70 to the electric burner 12, in various embodiments, may not communicate to the indicial light module 10 information corresponding to the illuminated indicia 52 to be communicated to the user of the appliance. It is also contemplated that a temperature sensor 90 and electrical sensor 150, such as a voltage sensor, resistor, or other electrical sensor 150, can operate in combination to communicate to the user various temperatures 56 and/or heating conditions 140 of the heating appliance 16. In such an embodiment, the various temperature and electrical sensors 90, 150 can be implemented while the electric burner 12 is in one of the active states 22. The various active states 22 of an electric burner 12 can include various temperatures 56 of the electric burner 12, and can also include various predefined heating conditions 140 of the heating appliance 16. Such predefined functions can include, but are not limited to, a preheat function, a warming function, a temperature function that fluctuates the flow of electricity to the electric burner 12 to maintain a consistent temperature 56 on the upper surface 18 of the cooktop 14, and other similar functions of the heating appliance 16. In addition to the voltage sensor, or other electrical sensor 150, the illuminated indicia 52 during operation of the various active states 22 of the heating appliance 16 and the electric burner 12 can be dictated by the control 160 for operating the heating appliance 16.

According to the various embodiments, when the flow of electrical current 70 to the electric burner 12 is interrupted and the electric burner 12 is placed in the deactive state 20, it may be necessary to implement the use of a temperature sensor 90 for accurately measuring the temperature 56 of the upper surface 18 of the cooktop 14. In such an embodiment, the cooldown state 24 of the heating appliance 16 can be accurately conveyed through the illuminated indicia 52 to the user of the heating appliance 16. Additionally, the use of a temperature sensor 90 can be implemented when a heated cooking article 170, such as a pot, pan, plate or other cooking article 170 is placed upon the upper surface 18 of the cooktop 14. While the electric burner 12 may not be in an active or cooldown state 22, 24, the heat from the cooking article 170 may transfer heat 72 from the cooking article 170 to the cooktop 14. The temperature 56 of the upper surface 18 of the cooktop 14 may become elevated as a result of the placement of the heated cooking article 170. In such a situation, the temperature sensor 90 of the heating appliance 16 can recognize an elevation in the surface temperature 56 of the cooktop 14, such that such a rise in surface temperature 56 can be communicated to the user through an illuminated indicia 52 provided by the indicial light module 10.

According to various embodiments, such a functionality may be useful, where the electric burner 12 is an inductive heating element. When an inductive heating element is used, the temperature 56 of the upper surface 18 of the cooktop 14 is not directly heated by the inductive electric burner 12. The operation of inductive heating causes the cooking article 170 placed upon the cooktop 14 to be heated through the formation of an induced electrical current 70 within the cooking article 170 that results in resistive heating formed within the cooking article 170 itself, rather than within the cooktop 14 of the heating appliance 16. The cooking article 170 that is heated through the inductive electric burner 12, can radiate heat 72 from the heated cooking article 170 and into the cooktop 14 that can result in an elevated temperature 56 of the upper surface 18 of the cooktop 14. The temperature sensor 90 can measure the increase in surface temperature 56 of the cooktop 14 and communicate to the user, through the illuminated indicia 52 provided by the indicial light module 10, the surface temperature 56 of the cooktop 14. Accordingly, the plurality of illuminated indicia 54 can include a plurality of heat-related illuminated indicia 52, wherein each heat related illuminated indicia 52 of the plurality of heat-related illuminated indicia corresponds to a respective surface temperature 56 of the translucent cooktop 14.

Figure 2:
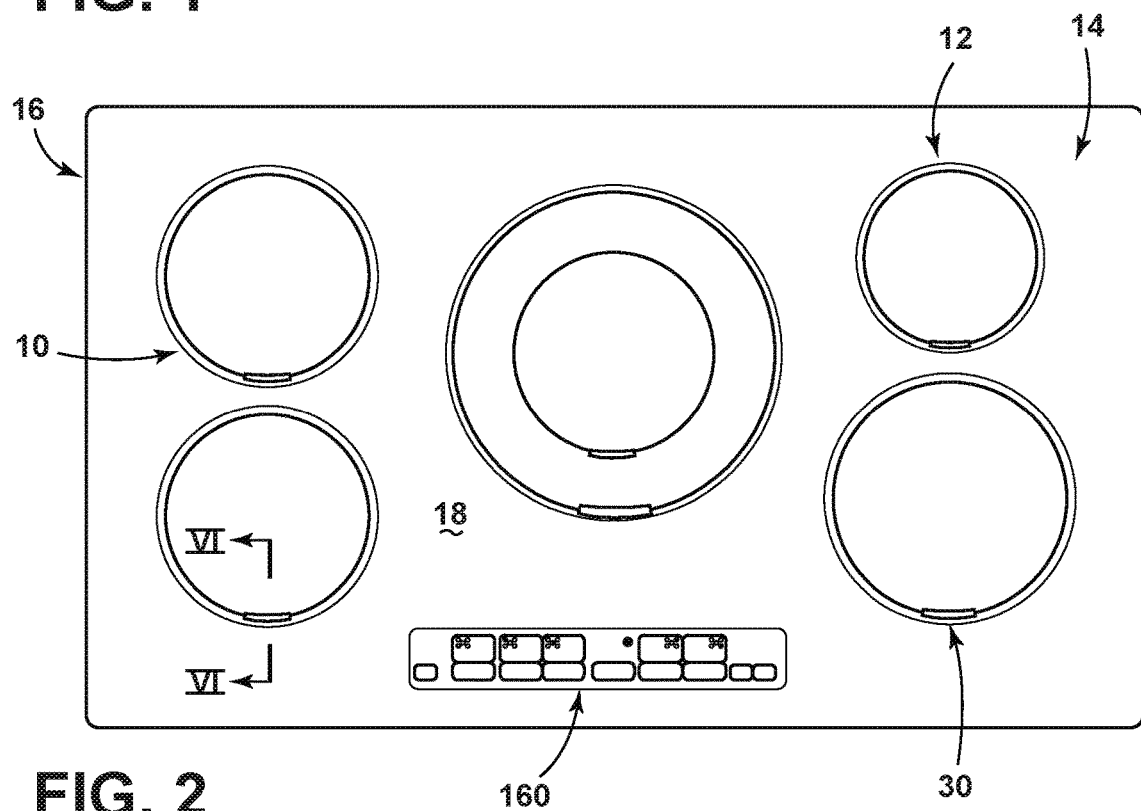
FIG. 2 is a top plan view of the cooktop of FIG. 1.
Figure 3:
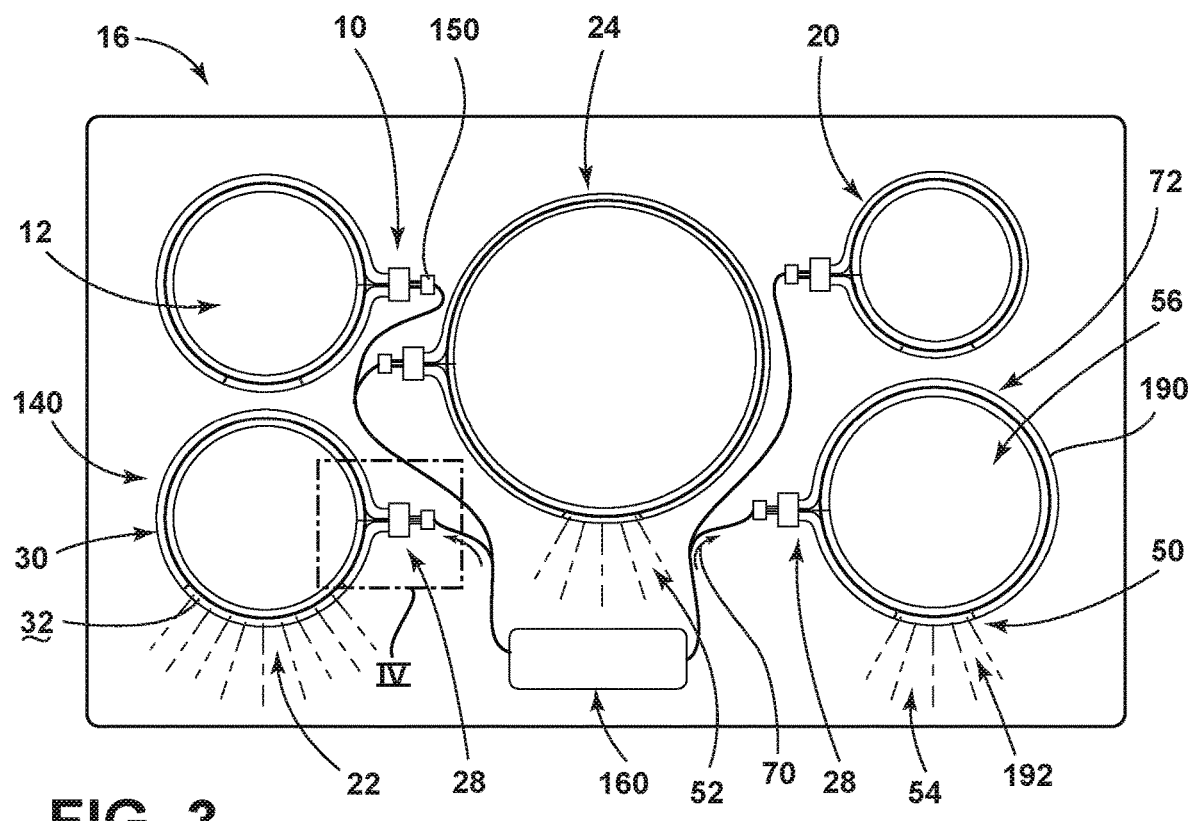
FIG. 3 is a top plan view of the cooktop of FIG. 2 with the translucent cooktop surface removed and exposing the electric burners and aspects of the indicial light module.
Figure 5:
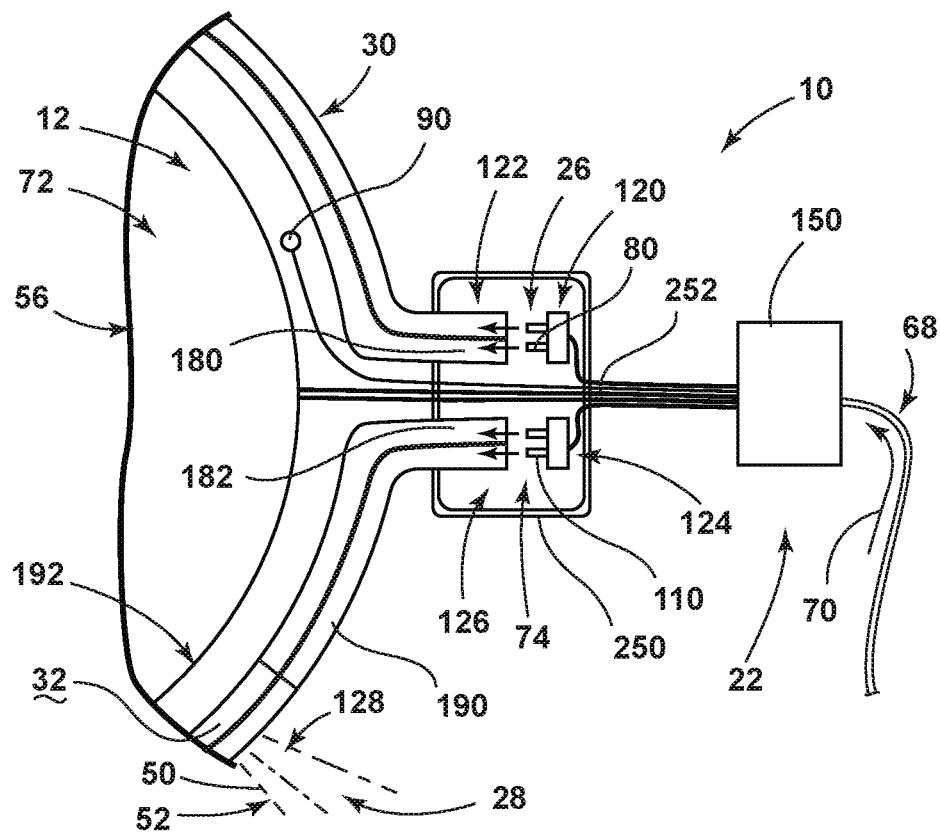
FIG. 5 is a top plan view of an alternate aspect of the cooktop of FIG. 4 illustrating a multi-component light guide of the indicial light module.

Referring now to the various aspects of the device as exemplified in FIGS. 2, 3 and 5, the light guide 30 for the indicial light module 10 can include one or more members that extend around at least a portion of the electric burner 12. It is contemplated that the light guide 30 can include first and second ends 180, 182 that are each positioned within a portion of the indicial light module 10. In this manner, a plurality of lighting elements 80 of the indicial light guide 30 can be positioned to direct light 50 through one or both of the first and second ends 180, 182 of the light guide 30. By directing light 50 through the first and second ends 180, 182 of the light guide 30, the colors from lighting elements 80 can be shown through the first and second ends 180, 182 of the light guide 30 to produce a wide range of individual or combined colors. By way of example, and not limitation, a red-colored first light element 120 can be positioned at a first end 180 of the light guide 30 and a yellow-colored second light element 124 can be positioned at the second end 182 of the light guide 30. In such an embodiment, yellow or red light can be produced by alternately activating one of the first and second light elements 120, 124. Additionally, where both the first and second light elements 120, 124 are activated, the red and yellow light from the first and second light elements 120, 124 can be mixed within the light guide 30 to produce an orange light, as a third color 128, within the light guide 30. Such mixing of light 50, commonly referred to as additive color mixing, can be implemented through the use of a wide range of colored lighting elements 80 to produce wide ranges of colors visible by the user through the upper surface 18 of the translucent cooktop 14.

According to various aspects of the device, the translucent cooktop 14 of the heating appliance 16 can be tinted such that the various internal components of the heating appliance 16 are obscured from view by the user. Translucency of the cooktop 14 is configured to be of a degree such that the mechanical and electrical mechanisms of the heating appliance 16 are generally not visible by the user. The translucency of the cooktop 14 is such that the illuminated indicia 52 provided by the indicial light module 10 is visible through the partially translucent cooktop 14. As a result of the partial translucency of the cooktop 14, the cooktop 14 may be tinted such that a substantially white light 50 positioned under the cooktop 14 may appear to be a different color when viewed from above the cooktop 14. In such an embodiment, the light guide 30 can be tinted, or a tinted member can surround the light guide 30. The effect of a tinted layer or tinted material of the light guide 30 is that the tinted light emanating from the light guide 30, when passed through the translucent cooktop 14, appears to the user as a visible light having a wavelength corresponding to a substantially predetermined colored light 110. Such a colored light 110 can include white, blue, red, yellow, any combination thereof, or any color desired for use as a component of the indicial illumination of the device.

Referring again to FIGS. 2-5, according to various aspects of the device, the illuminated indicia 52 can be positioned within specific portions of the cooktop 14, proximate each of the respective electric burners 12. It is contemplated that each electric burner 12 can have its own dedicated indicial light module 10 for providing an independent and dedicated illuminated indicia 52 for each of the electric burners 12 of the heating appliance 16. To assist in directing the illuminated indicia 52, portions of the light guide 30 can be covered by an opaque covering 190 that limits the delivery of the illuminated indicia 52 to be from only specific portions of the light guide 30. It is contemplated that the illuminated indicia 52 can be positioned in front 192 of each of the electric burners 12, such that the illuminated indicia 52 can be visible under or around the cooking utensil placed upon an electric burner 12. Accordingly, the illuminated indicia 52 may be a linear or arcuate member that extends around only a small portion of the electric burner 12. It is also contemplated that the light guide 30 can be configured to convey the illuminated indicia 52 around the entire circumference of the electric burner 12 or one or more portions of the circumference of the electric burner 12.

According to the various embodiments, in order to allow the illuminated indicia 52 to be directed toward the cooktop 14 by particular portions of the light guide 30, the light guide 30 can include a conditioned portion or a conditioned surface 34 that allows light 50 to be directed from the interior of the light guide 30 and toward the cooktop 14 to produce the illuminated indicia 52 for the heating appliance 16. Such conditioned surface 34 or conditioned portion can include, but is not limited to, a surface texture, a geometric shape incorporated within the light guide 30, and other similar conditioned surfaces 34 that are configured to direct light 50 upward and through the surface of the translucent cooktop 14. The use of the conditioned surface 34 can, in various embodiments, make the user of the opaque covering 190 unnecessary, as will be described more fully below.

Figure 4:
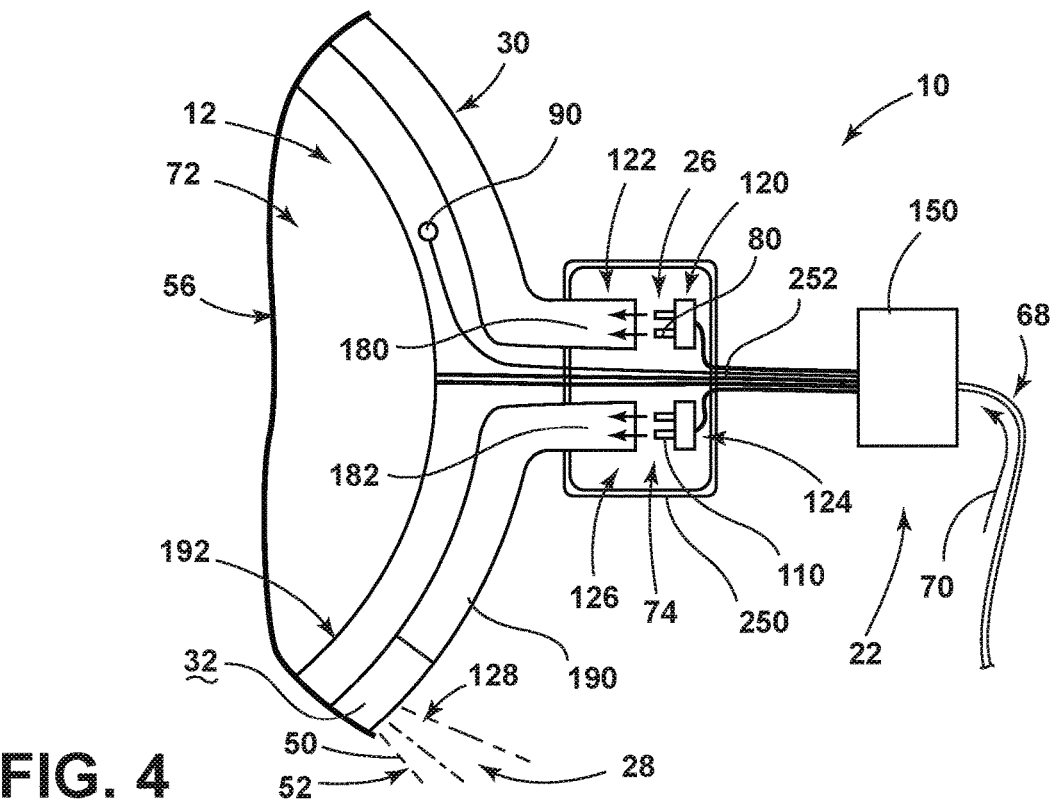
FIG. 4 is an enlarged plan view of the cooktop of FIG. 3 taken at area IV.
Figure 6:
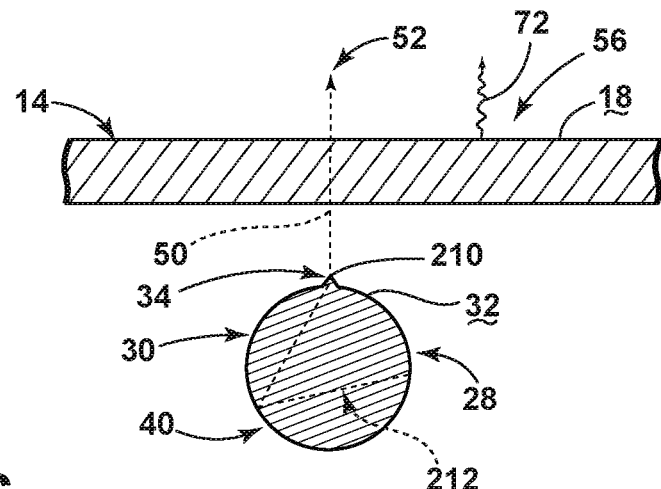
FIG. 6 is a cross-sectional view of the indicial light module of FIG. 2 taken along line VI VI, and illustrating a solid silicone light guide of the indicial light module.
Figure 7:
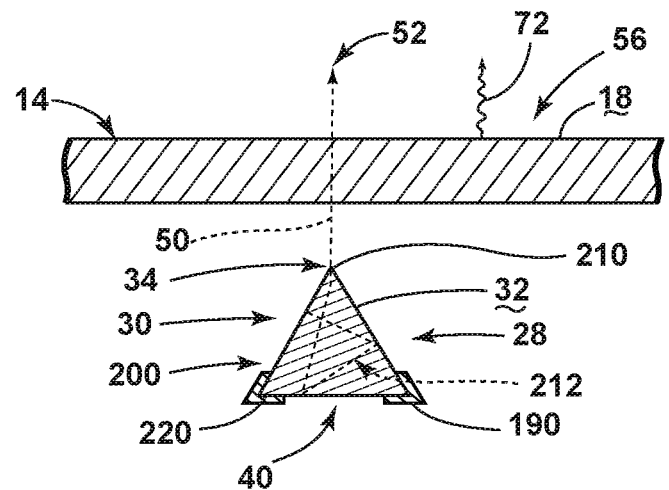
FIG. 7 is a cross-sectional view of an alternate aspect of the indicial light module of FIG. 6 showing a triangular prism light guide.

Referring now to the embodiment illustrated in FIGS. 3, 4 and 6, it is contemplated that the light guide 30 for directing light 50 from the indicial light module 10 can be a silicone light guide 30 that is a solid silicone prism 40 that extends at least partially around the electric burner 12. The light guide 30 can also include a plurality of solid silicone prisms 40 that extend at least partially around the electric burner 12. The one or more solid silicone prisms 40 can be formed into any one of various shapes or prismatic cross-sectional shapes that can include, but are not limited to, a cylindrical prism, triangular prism 200, rectilinear prism, irregular prism, hemispheric prism, combinations thereof, or other substantially similar substantially solid shape. Each of the one or more solid silicone prisms 40 can be in communication with one or more dedicated lighting elements 80 for directing light 50 through a corresponding solid silicone prism 40. The use of the term "solid" is meant to convey that the silicone light guide 30 is formed to be substantially free or free of voids, air pockets, foreign material, and other particulate matter within the interior of the silicone light guide 30. Such materials disposed within the interior of the silicone light guide 30 can serve to impede the movement and reflection of light 50 within the silicone light guide 30 for ultimate delivery through the conditioned surface 34 or geometric portion of the silicone light guide 30. Such foreign material can diminish the amount of light 50 that is directed to the cooktop 14 for defining the illuminated indicia 52. According to various aspects of the device, the conditioned surface 34 of the silicone light guide 30 can include a raised elongated ridge 210 that extends along a portion of the silicone light guide 30. Such a raised elongated ridge 210 can be formed through a triangular prism-shaped light guide that extends around a portion of the electric burner 12. In such an embodiment, the raised elongated ridge 210 can be configured to produce an illuminated indicia 52 in the form of a fine illuminated line directed from the silicone light guide 30 and through the translucent cooktop 14 for observation by the user of the heating appliance 16.

The solid silicone light guide 30 may be shaped to create the phenomena of total internal reflection 212 within portions of the solid silicone light guide 30. In these portions, light 50 from the one or more light fixtures is directed such that no portion or substantially no portion of the light escapes the light guide 30. Where a conditioned portion is present, the surface of the light guide 30 becomes slightly less efficient such that at least a portion of the light 50 is directed to escape through the conditioned portion of the light guide 30 and cause the formation of the illuminated indicia 52 through the cooktop 14. It is also contemplated that the opaque covering 190 and the conditioned surface 34 can be located on various positions of the light guide 30 and can be used independently or used in conjunction to direct light 50 emanating from the conditioned portion of the light guide 30 to generate the various illuminated indicia 52 within the cooktop 14. It is contemplated that the opaque portion can have a reflective inward surface that assists in the internal reflection 212 of light 50 through the light guide 30 and also direct light 50 to the conditioned portion for forming the illuminated indicia 52. In addition, it is contemplated that the conditioned surface 34 of the light guide 30 can also be included on or within a bottom surface of the light guide 30. In such an embodiment, it is contemplated that the top side of the light guide 30 can be substantially smooth. The top side of the light guide 30, as well as each surface of the light guide 30, can also include various geometries, including but not limited to, flat, arcuate, ridged, irregular, polygonal, combinations thereof, and other similar geometries for directing light 50 through a portion of the cooktop 14.

According to the various aspects of the device, the use of silicone within the heating appliance 16 serves as an efficient conductor of light 50 to act as a light guide 30 for delivering illumination from the indicial light module 10 for conveying the illuminated indicia 52 to the user of the heating appliance 16. Additionally, silicone is a generally heat resistive material that is unaffected or substantially unaffected by high levels of heat 72. Accordingly, placement of the silicone light guide 30 proximate an electric burner 12 will not affect or substantially not effect the operation of the silicone light guide 30 in use of a heating appliance 16 and indicial light module 10. Additionally, silicone is a material that is relatively formable and efficient to work with to form various consistent geometries for forming the silicone light guide 30 for use with the indicial light module 10.

Figure 8:
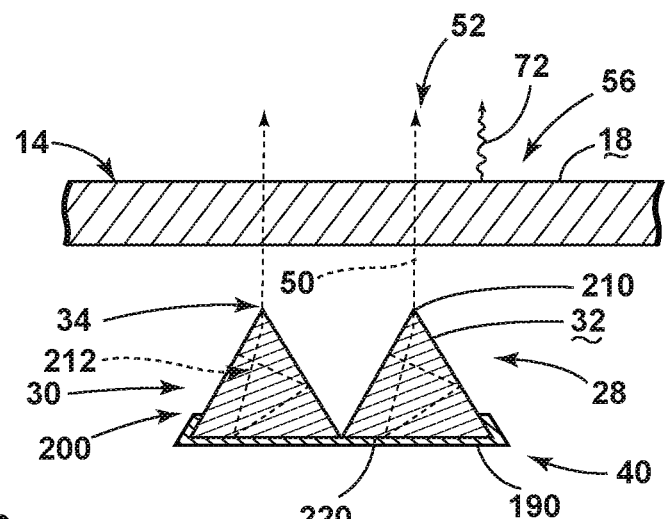
FIG. 8 is a cross-sectional view of an alternate aspect of the indicial light module of FIG. 7, illustrating a multi-part light guide of the indicial light module.
Figure 11:
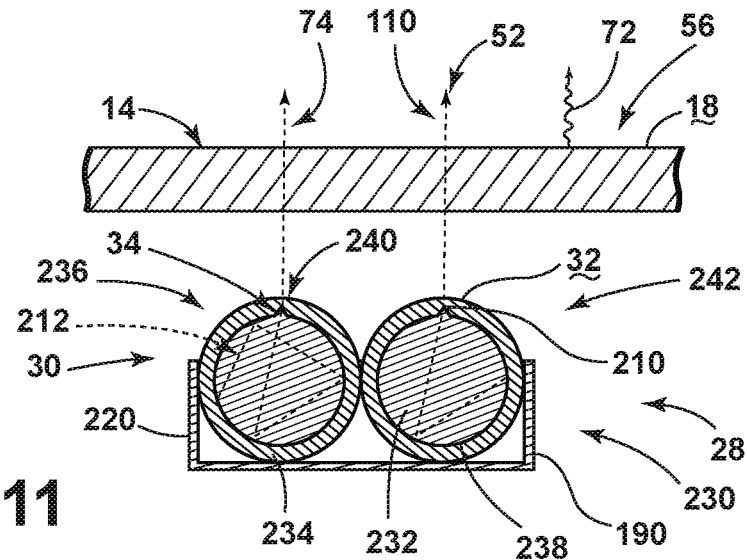
FIG. 11 is a cross-sectional view of an alternate aspect of the indicial light module of FIG. 9 illustrating a multi-part light guide.
Figure 12:
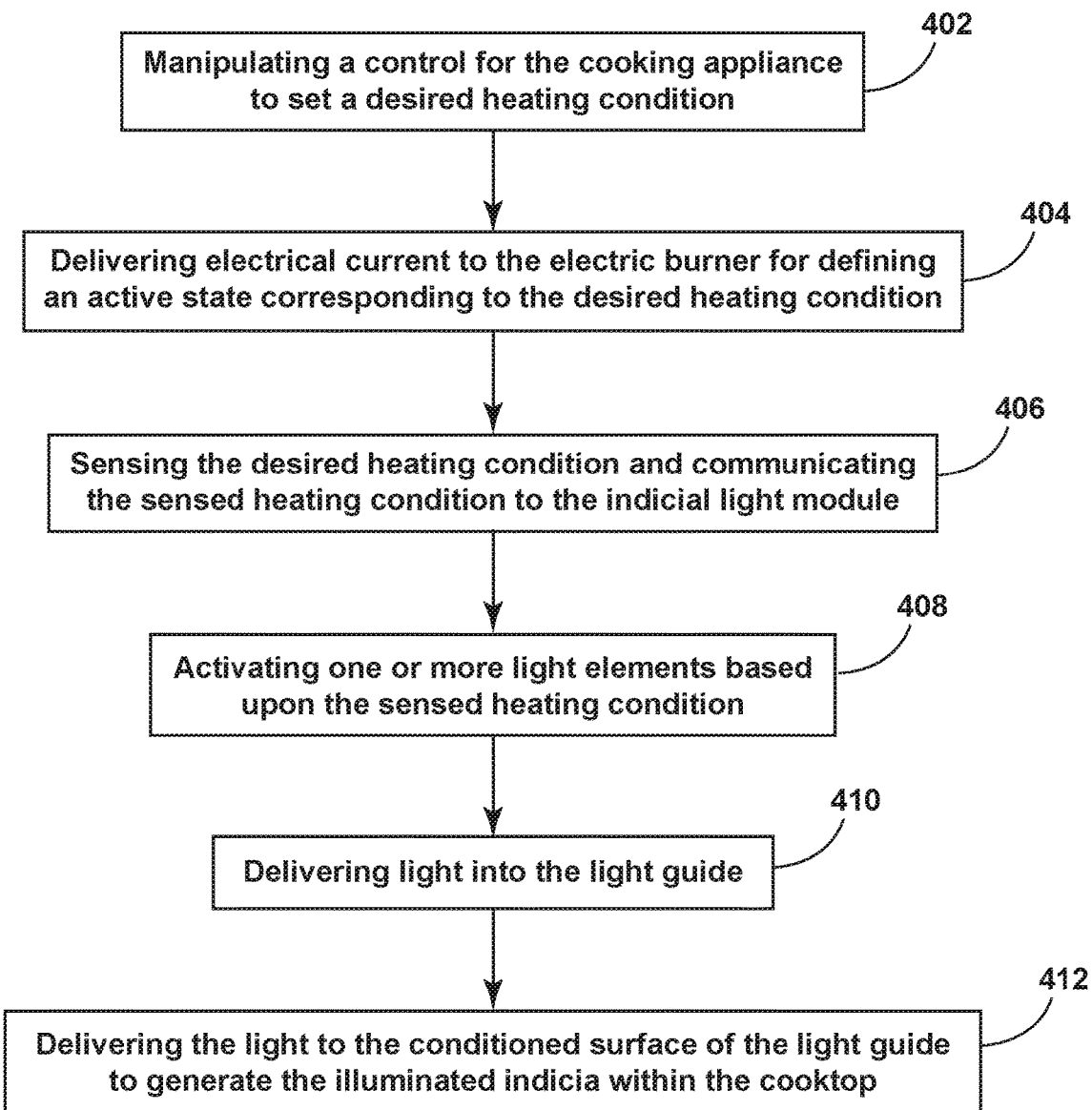
FIG. 12 is a schematic flow diagram illustrating a method for communicating the heating condition of a cooking surface of a heating appliance.

Referring now to FIGS. 5 and 11, it is contemplated that the silicone light guide 30 can include a single light guide member or multiple light guide members for delivering light 50 from the various light fixtures of the indicial light module 10 to the upper surface 18 of the translucent cooktop 14. While FIGS. 6 and 8 illustrate a pair of silicone light guides 30, it is contemplated that three or more light guides 30 can be incorporated within the heating appliance 16 for conveying multiple illuminated indicia 52 for conveying various information during use of a heating appliance 16. A light guide frame 220 can be implemented to obtain the plurality of light guides 30 in a desired configuration with respect to the indicial light module 10 and the electric burner 12. The frame 220 can also serve as part of the opaque covering 190 for the light guide 30.

Figure 9:
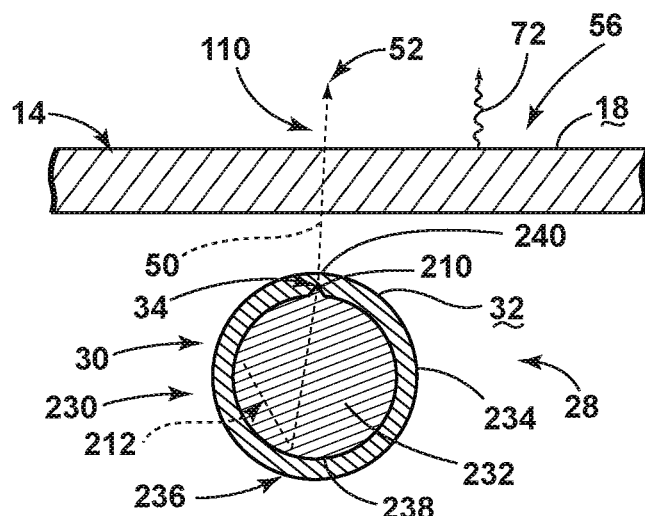
FIG. 9 is a cross-sectional view of an alternate aspect of an indicial light module.
Figure 10:
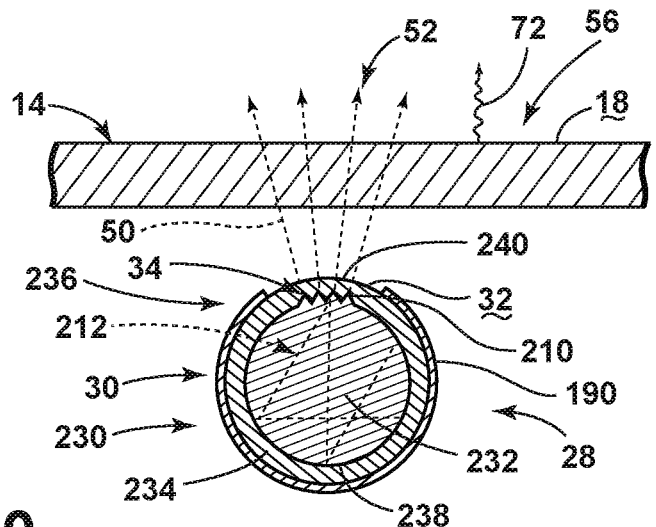
FIG. 10 is a cross-sectional view of an alternate aspect of the indicial light guide of FIG. 9.

Referring now to the various aspects of the device as exemplified in FIGS. 9-11, the light guide 30 for use in delivering light 50 from the indicial light module 10 to the translucent cooktop 14 can include one or more fiber optic light guides 230 that extends from the indicial light module 10 that extends around a portion of the electric burner 12. In such an embodiment, the fiber optic light guide 230 can be positioned such that the lighting element 80 directs light 50 through the fiber optic light guide 230 and through an outer surface 32 of the fiber optic light guide 230 that includes the conditioned surface 34 for directing light 50 upward and through the translucent cooktop 14. It is contemplated that each fiber optic light guide 230 can include a core member 232, typically made of plastic, clear silicone or glass, and a cladding member 234 that extends around the core member 232 to protect the core member 232. According to the various embodiments, each fiber optic light guide 230 can include an edge-emitting fiber 236 where a boundary 238 between the core member 232 and cladding member 234 is slightly inefficient, thereby forming the conditioned surface 34. Typically, each fiber optic light guide 230 results in light 50 being transmitted along and through the fiber optic core member 232 through the process of total internal reflection 212. As a result of total internal reflection 212, light 50 is transferred along the fiber optic light guide 230 from one end to the other. Where the boundary 238 between the core member 232 and cladding member 234 is made to be slighting inefficient through a surface texture, geometric shape, or other similar conditioned surface 34, the process of total internal reflection 212 is at least partially interrupted such that a portion of the light 50 is directed through the conditioned surface 34 and through an edge 240 of the fiber optic light guide 230. In this manner, light 50 can be directed from the fiber optic light guide 230 through the conditioned surface 34 to the transparent cooktop 14 of the heating appliance 16.

According to the various embodiments, as exemplified in FIGS. 9-11, each fiber optic light guide 230 can include a conditioned surface 34 in the form of a textured surface along the boundary 238 between the core member 232 and the cladding member 234. Additionally, the conditioned surface 34 can be a raised elongated ridge 210 that extends along the portion of the fiber optic light guide 230, such as along the boundary 238 between the core member 232 and the cladding member 234. Additionally, the fiber optic light guide 230 can include a plurality of fiber optic members 242 that extend at least partially around the electric burner 12 to convey the various illuminated indicia 52 through the translucent cooktop 14, as dictated by the selected function of the heating appliance 16 and/or the temperature 56 of the upper surface 18 of the cooktop 14.

According to various embodiments, the one or more light fixtures that direct light 50 through at least one of the first and second ends 180, 182 of the light guide 30 can be one or more of various types of light fixtures. Such light fixtures can include, but are not limited to, light emitting diode (LED), incandescent, fluorescent, halogen, combinations thereof, and other similar light fixtures. It is also contemplated that the indicial light module 10 can include a housing 250 that at least partially encloses the light fixtures and the first and second ends 180, 182 of the light guide 30. The housing 250 can also serve as a conduit through which electrical wiring 252 can extend to provide electrical current 70 to the electric burner 12 and/or the indicial light guide 30. In such an embodiment, the housing 250 can include the electric sensor for measuring the flow of electrical current 70 through the electrical wiring 252. It is also contemplated that the temperature sensor 90 can be positioned proximate the housing 250.

Referring now to the various aspects of the device as illustrated in FIGS. 1-12, having described various aspects of the device, a method 400 is disclosed for providing an illuminated indicia 52 for communicating the heating state of a heating appliance 16. According to the method 400, a control 160 for the heating appliance 16 is manipulated to set a desired heating condition (step 402). Based upon the heating condition selected, a level of electrical current 70 is delivered to the electric burner 12 of a heating appliance 16 for generating heat 72 (step 404). The flow of electricity to the electric burner 12 results in the electric burner 12 being placed in one of the active states 22 and heat 72 being delivered to a cooking utensil such as a pot or pan. In the case of a resistive heating element, the electric burner 12 provides direct heat 72 that is transferred to the cooktop 14, and then to the cooking utensil. In the case of an induction burner, the inductive process forms heat 72 within the cooking utensil through the creation of an induced electrical current 70 within the cooking utensil itself.

According to another aspect of the method 400, when the electric burner 12 is placed is one of the active states 22 of the heating appliance 16, a sensor communicates to the indicial light module 10 the selected heating condition (step 406). The heating condition can be a temperature and/or function of the heating appliance 16. The sensor can be a temperature sensor 90 that detects the temperature 56 of the upper surface 18 of the cooktop 14. The sensor can also be a voltage sensor that detects the flow of electrical current 70 to the electrical burner, where the sensor communicates the presence of an electrical current 70 to the control 160, which operates the indicial light module 10. The indicial light module 10, in response to the information from the sensor, activates one or more lighting elements 80 (step 408). The lighting elements 80 deliver light 50 into at least one of a first and second end 180, 182 of the light guide 30 where the light 50 is internally reflected within the light guide 30 (step 410). The internally reflected light 50 within the light guide 30 is delivered to a conditioned surface 34 of the light guide 30 where the light 50 is allowed to partially escape the light guide 30 and be directed toward the upper surface 18 of the cooktop 14 where the light 50 directed by the light guide 30 is visible by a user during operation of the cooktop 14 (step 412).

According to the various embodiments, as the user of the heating appliance 16 adjusts the user interface to select a different temperature 56 or different heating condition of the heating appliance 16, such change at the user interface can result in a change in temperature 56 of the upper surface 18 of the cooktop 14 or a change in the flow of electrical current 70 to the electric burner 12. This change in temperature 56 or flow of electrical current 70 can be detected by one of the sensors and communicated to the indicial light module 10, resulting in a different combination of light fixtures being illuminated, or a different intensity of illumination for one or more of the light sensors.

It is also contemplated that modification of the user interface can be directly communicated to the indicial light module 10, where a change in temperature 56 or a change in heating condition at the user interface is directly communicated to the indicial light module 10 to modify the illuminated indicia 52 provided by the indicial light module 10 through the light guide 30 and to the upper surface 18 of the cooktop 14.

It is further contemplated that the temperature sensor 90 disposed proximate the cooktop 14 can be in communication with the upper surface 18 of the cooktop 14 to record a surface temperature 56 of the cooktop 14 proximate the electric burner 12. The temperature 56 recorded by the sensor can be delivered to the indicial light module 10 or to a control 160 for operating the indicial light module 10 for modifying the combination of light fixtures to be activated, deactivated or modulated to convey the proper illuminated indicia 52 to the user of the heating appliance 16. The temperature sensor 90 can also be implemented to convey the state of the upper surface 18 of the cooktop 14 after the electric burner 12 is deactivated. Such a configuration can be implemented to convey to the user a cool down state of the heating appliance 16, whereby the electric burner 12 are deactivated, but the upper surface 18 of the cooktop 14 remains at an elevated temperature 56 for a period of time. The temperature sensor 90 detects the surface temperature 56 of the cooktop 14 as the cooktop 14 cools to a temperature at or near the ambient air temperature of the room within which the cooking appliance is placed.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the device as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. A heating appliance comprising:
   a translucent cooktop;

an electric burner positioned in thermal communication with an upper surface of the translucent cooktop, the electric burner being operable between a deactive state and at least one active state, wherein the upper surface of the translucent cooktop proximate the electric burner defines a cooldown state after the electric burner is moved from the at least one active state to the deactive state;

a light module including at least one light source that is illuminated in the at least one active state and the cooldown state; and a light guide extending from the at least one light source and extending around a portion of the electric burner such that the at least one light source directs light through the light guide, wherein an outer surface of the light guide includes an elongated formed surface that directs and concentrates the light upward and through the translucent cooktop and is visible through the translucent cooktop, wherein the elongated formed surface is a single prism-shaped extrusion that extends uniformly and continuously along only a top portion of the light guide.

2. The heating appliance of claim 1, wherein the light guide is a silicone light guide that is a solid silicone prism that extends at least partially around the electric burner.

3. The heating appliance of claim 2, wherein the at least one light source is illuminated when electrical current is delivered to the electric burner.

4. The heating appliance of claim 2, further comprising:
a temperature sensor in communication with the translucent cooktop, wherein the temperature sensor records a surface temperature of the translucent cooktop proximate the electric burner, and wherein the cooldown state is defined by the surface temperature of the upper surface of the translucent cooktop exceeding a predetermined temperature after flow of electrical current to the electric burner is interrupted.

5. The heating appliance of claim 2, wherein the single prism-shaped extrusion is a triangular prism.

6. The heating appliance of claim 2, wherein the at least one active state of the electric burner includes a plurality of electric power levels, and wherein an illuminated state of the light module includes a plurality of lighting intensities that corresponds to the plurality of electric power levels.

7. The heating appliance of claim 6, wherein the plurality of lighting intensities are generated by a plurality of lighting elements positioned within the light module.

8. The heating appliance of claim 2, wherein the elongated formed surface of the silicone light guide is tinted such that light visible through the translucent cooktop from the silicone light guide includes a visible light wavelength corresponding to a substantially white color.

9. The heating appliance of claim 2, wherein the electric burner is a resistive heating element.

\* \* \* \* \*